United States Patent [19]

Maczey et al.

[11] Patent Number: 5,353,361
[45] Date of Patent: Oct. 4, 1994

[54] METHOD FOR ASSEMBLING A LIGHT WAVE GUIDE SWITCH

[75] Inventors: Christoph Maczey; Joachim Schulze; Klaus Schulz, all of Berlin, Fed. Rep. of Germany

[73] Assignee: Siemens Aktiengesellschaft, Munich, Fed. Rep. of Germany

[21] Appl. No.: 941,063

[22] PCT Filed: Feb. 15, 1991

[86] PCT No.: PCT/DE91/00130
§ 371 Date: Dec. 8, 1992
§ 102(e) Date: Dec. 8, 1992

[87] PCT Pub. No.: WO91/16651
PCT Pub. Date: Oct. 31, 1991

[30] Foreign Application Priority Data

Apr. 12, 1990 [DE] Fed. Rep. of Germany ....... 4012510

[51] Int. Cl.$^5$ .............. G02B 6/26; B65H 69/02; H01H 11/00; B23K 26/00
[52] U.S. Cl. ............................... 385/16; 385/23; 385/24; 385/25; 385/52; 385/136; 385/137; 385/147; 83/913; 156/158; 156/159; 156/166; 29/622; 219/121.6; 219/121.69
[58] Field of Search ................ 385/16, 24, 25, 52, 385/17, 20, 23, 134, 136, 137, 147; 156/158, 159, 160, 161, 166; 83/913; 65/10.2, 11.1; 29/622; 219/121.6, 121.67, 121.69

[56] References Cited

U.S. PATENT DOCUMENTS

| | | | |
|---|---|---|---|
| 4,189,206 | 2/1980 | Terai et al. | 385/23 X |
| 4,239,331 | 12/1980 | Aoyama | 385/16 X |
| 4,303,302 | 12/1981 | Ramsey et al. | 385/23 X |
| 4,318,587 | 3/1982 | Grassl | 385/23 X |
| 4,325,604 | 4/1982 | Witte | 385/25 |
| 4,514,034 | 4/1985 | Bruch | 385/23 X |
| 4,699,457 | 10/1987 | Goodman | 385/25 |
| 4,911,520 | 3/1990 | Lee | 385/16 |
| 5,098,207 | 3/1992 | Blomgren | 385/16 |
| 5,187,758 | 2/1993 | Ueda et al. | 385/16 |

FOREIGN PATENT DOCUMENTS

| | | | |
|---|---|---|---|
| 0064751 | 11/1982 | European Pat. Off. | 385/16 X |
| 0098816 | 1/1984 | European Pat. Off. | |
| 0298260 | 1/1989 | European Pat. Off. | 385/16 X |
| 3741761 | 7/1989 | Fed. Rep. of Germany | 385/16 X |
| 61232719 | 4/1988 | Japan . | |
| 62-20381 | 8/1988 | Japan . | |
| WO90/04804 | 5/1990 | PCT Int'l Appl. | 385/16 X |

OTHER PUBLICATIONS

Patent Abstracts of Japan, vol. 12, No. 464, Dec. 6, 1988, & JP-A-63188485, Aug. 4, 1988.
Patent Abstracts of Japan, vol. 12, No. 319, Aug. 30, 1988, & JP-A-6385507, Apr. 16, 1988.
Patent Abstracts of Japan, vol. 12, No. 112, Apr. 9, 1988, & JP-A-62240918, Oct. 21, 1987.

*Primary Examiner*—Brian Healy
*Attorney, Agent, or Firm*—Kenyon & Kenyon

[57] ABSTRACT

A method for assembling a light wave guide switch calls for a switch having two groups of front ends of light wave guides. Each group of front ends faces the other group of front ends and each group is disposed on opposite sides of a coupling plane running perpendicular to the longitudinal axes of the light wave guides. The switch also has centering devices that extend parallel to each other, without offset, from a first end of a base plate to a second end of the base plate. The centering devices secure a plurality of light wave guides each extending through the coupling plane when each of the wave guides forms a single component. The method includes the steps of coupling the first end of the base plate to a stationary part of the switch and coupling a second end of the base plate to a drivable part of the switch while the switch is in the given switching position. The method also includes the steps of cutting the light wave guides with a laser in the coupling plane and cutting the base plate in the region of the coupling plane.

12 Claims, 1 Drawing Sheet

METHOD FOR ASSEMBLING A LIGHT WAVE GUIDE SWITCH

BACKGROUND OF THE INVENTION

The present invention relates to a method for assembling a light guide switch.

Such a switch includes two groups of end faces or facets of light wave guides. Each group of end faces is arranged to face the other group of end faces and each group is disposed on opposite sides of a coupling plane that runs perpendicular to the longitudinal axes of the light wave guides. The switch also includes centering devices that extend parallel to one another, without offset, from a first end of a base plate to a second end of the base plate. The centering devices secure a plurality of light wave guides that each extend through the coupling plane when each of the wave guides forms a single component. The light wave guides are cut in the coupling plane, and the base plate is cut in the region of the coupling plane.

Communications networks, particularly local data networks, can be implemented in a particularly effective manner by using optical data transmission with light wave guides. For such data networks, switching locations are required so that it is possible to couple together different light wave guides, if necessary. Switches for the light wave guides, which are to be coupled at their end faces, are aligned with one another in a given switching state, and are radially offset from each other in another switching state.

A light wave guide switch such as described above is disclosed, for example, in DE-OS-37 41 761. In the switch described therein, three light wave guides are each attached to a stationary and a drivable part of the switch. The wave guides are positioned next to and parallel to each other. The drivable switching piece is movable in a direction perpendicular to the longitudinal axis of the light wave guide, so that if desired, different pairs of light wave guides can be coupled with each other. The end faces of two light wave guides that are to be coupled should face one another with the minimum possible coupling distance therebetween so that good coupling quality with little attenuation is achieved.

E A 098 816 discloses a method for producing parts of an optical switch of the type discussed above in which single-component light wave guides are first secured in the centering grooves of a single-component base plate. The wave guides and the base plate are cut with a cutting tool. Subsequently, the cut parts may be installed in a switch.

The present invention is directed to the development of an efficient method for assembling a light wave guide switch in which the coupling distance between the end faces of the light wave guides can determined in a reproducible manner.

SUMMARY OF THE INVENTION

The present invention provides a method for assembling a light wave guide switch in which the first end of a base plate is coupled to a stationary part of the switch and a second end of the base plate is coupled to a drivable part of the switch while the switch is in a given switching position. The light wave guides are cut with a laser in the coupling plane and the base plate is cut in the region of the coupling plane.

The switch is already provided with a drive device and stationary and movable switching pieces. The drive device may be an electromagnet, for example, and the movable switching piece can be formed as a magnet armature. In the switch as it is completed to this point, a base plate is attached. The plate is attached so that the centering devices (for example, centering grooves), which extend on the plate without offset, run from the first end of the base plate, which is connected to a stationary part of the switch, to the second end of the base plate, which is connected to the drivable part of the switch (e.g., a movable switching piece). The base plate is attached in the switch by means of an adhesive, for example. The adhesive can also equalize tolerances so that the base plate can be securely attached independent of any height differences between the stationary part of the switch and the drivable part.

When the base plate is attached, the switch is in a given switching state. The light wave guides, which extend through the region of the coupling plane, are fixed in place in the centering devices either before or after the base plate is attached to the switch. After the base plate is attached, the light wave guides are cut in the coupling plane by means of a laser. The cutting width dividing the light wave guides can be adjusted via the optical parameters, particularly the geometrical parameters, of the laser beam. This cutting width can be accurately maintained to within a few $\mu$m. In this way, the desired coupling distance of approximately 10 $\mu$m can be accurately maintained between the front ends of the fibers. A coupling distance of 10 $\mu$m is desirable because on the one hand, it is large enough to avoid mutual contact between the front ends of the fibers when the switch is moved, but on the other hand it is small enough to guarantee a good coupling of the light wave guides.

After the light wave guides are cut, the base plate is cut in the region of the coupling plane. From this point on, the two parts of the switch can be moved relative to one another, so that different pairs of light wave guides can be coupled with one other.

Since the switch is in a given switching state when the base plate is being attached, and since the centering devices extend without offset on the base plate, the light wave guides are automatically aligned in this given switching position after being cut. If other parts of light wave guides are to be coupled to each other in another switching position, a stop is needed to define a second switching state. This stop must be subsequently adjusted.

The base plate can be cut in the region of the coupling plane by breaking the plate at a pre-determined breaking point or by cutting out a strip between two pre-determined breaking points in the region of the coupling plane, for example. The base plate also may be advantageously cut by means of a laser.

By using a laser, the base plate can be cut precisely, without using force. This results in cut surfaces that are sufficiently smooth and which have a distance from one another that is adjustable via the laser parameters. In this way, mutual contact between the cut surfaces during the switching process is prevented. Since the material is evaporated by the laser when the base plate is cut, no broken pieces are produced, which could hinder the switching process and contaminate the switch. The base plate also can be cut simultaneously with the light wave guides, in a single working step.

It is also advantageous to cut the base plate before the light wave guides. This prevents the evaporated material of the base plate from settling on the exposed front ends of the light wave guides and increasing the coupling attenuation by contaminating the front ends.

The end faces of the light wave guides are of particularly good quality if the light wave guides, together with their coating, are cut in the coupling plane by means of a laser. The coating of the light wave guides can be removed in the region of the coupling plane, before being cut, and then sheathed with plastic. By sheathing the light wave guides with the coating or with an applied plastic, breakage of the facets of the light wave guides during the laser cutting is prevented, and surfaces with very good optical quality are produced.

It is advantageous if the plastic applied to the light wave guides is applied in liquid form. A drop of the plastic is applied to each light wave guide in the region of the coupling plane, where it adheres by adhesion. The plastic can be applied to all the light wave guides simultaneously, by means of a comb-like arrangement.

In order to prevent dripping of the plastic from a light wave guide before using the laser, it is advantageous to use an adhesive as the plastic. This adhesive should cure before the drop can drip from the light wave guide. If the adhesive can cured by UV light, the drop can be cured and fixed in place immediately after it is applied by using UV radiation.

According to another aspect of the invention, the base plate may have a window-like, continuous recess in the region of the coupling plane so that cross-pieces disposed on both sides of the base plate remain, which extend parallel to the light wave guides.

If the base plate has been cut at pre-determined breaking points, the recess in the region of the coupling plane ensures that the end faces of the light wave guides to be coupled are not contaminated by any resulting broken pieces that are produced. Even if the base plate is cut by means of a laser, the contamination of the front ends of the light wave guides is reduced, since no material of the base plate is present in the region of the light wave guides to be evaporated by the laser.

It is particularly easy to work on the base plate if it is formed from silicon. Very precise, continuous centering grooves can be formed in the silicon by anisotropic etching. The pre-determined breaking points which might be necessary in the base plate are also easily implemented in a silicon plate, by etching in grooves.

DETAILED DESCRIPTION

Figure 1:
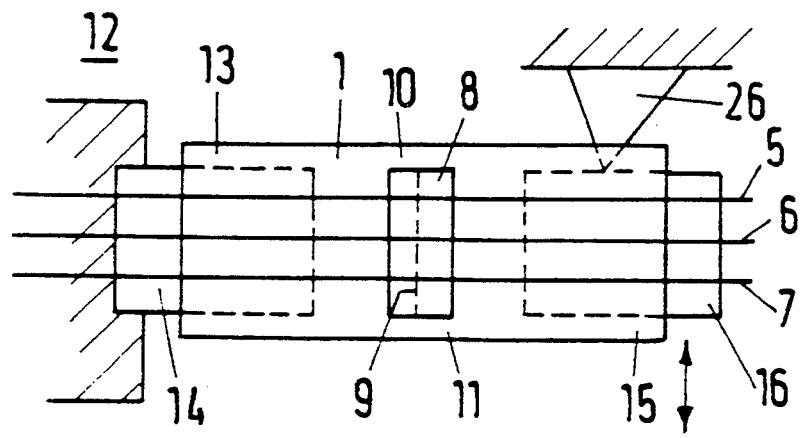
FIG. 1 shows a schematic view of the base plate in a light wave guide switch constructed according to the principles of the present invention.
Figure 2:
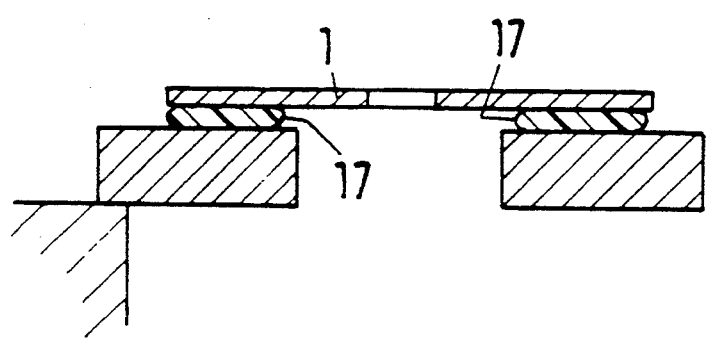
FIG. 2 is a cross-sectional view of the base plate seen in FIG. 1 with its holder.

The base plate 1, which consists of silicon, has centering grooves 2, 3 and 4, in which light wave guides 5, 6 and 7 are fixed in place by means of an adhesive. The base plate 1 has a window-like recess 8 in the region of the coupling plane 9. The recess 8 leaves two cross-pieces 10 and 11 of the base plate 1 disposed on both sides of the light wave guides 5, 6 and 7, which are parallel thereto. The light wave guides 5, 6 and 7 which are fixed in place in the grooves 2, 3 and 4, each extend through the coupling plane 9 in one unbroken piece.

The base plate 1, with the light wave guides 5, 6 and 7 fixed thereon, is attached in a switch 12 in such a way that the first end 13 of the base plate 1 is connected with a stationary part 14 of the switch, while the second end 15 of the base plate 1 is connected with a movable switching piece 16 of the switch. The connection is produced by means of an adhesive 17, which additionally serves as a tolerance equalizer for potential height differences between the stationary part 14 of the switch and the movable switching piece 16. The switch 12 is in a given switching position while the base plate 1 is being attached at these two parts of the switch 12. In this given switching position the movable switching piece 16 rests against a fixed stop 26 of the switch 12.

After the base plate 1 is attached in the switch 12, the cross-pieces 10 and 11 of the base plate 1, as well as the light wave guides 5, 6 and 7, are cut in the coupling plane 9 by means of a laser. In this regard, it is important that the coating 18 of the light wave guides remains intact until the laser cutting takes place at the cutting site. However, instead of the coating, a different plastic, for example in the form of a drop 19, can be applied to the light wave guides 5, 6 and 7 at the cutting site.

Due to the presence of the coating or plastic drop at the cutting site, the end faces of the light wave guides have an excellent quality at the cutting site when they are cut by a laser. The splintering of glass at that location is avoided. This results in good quality coupling when the light wave guides are coupled.

Figure 3:
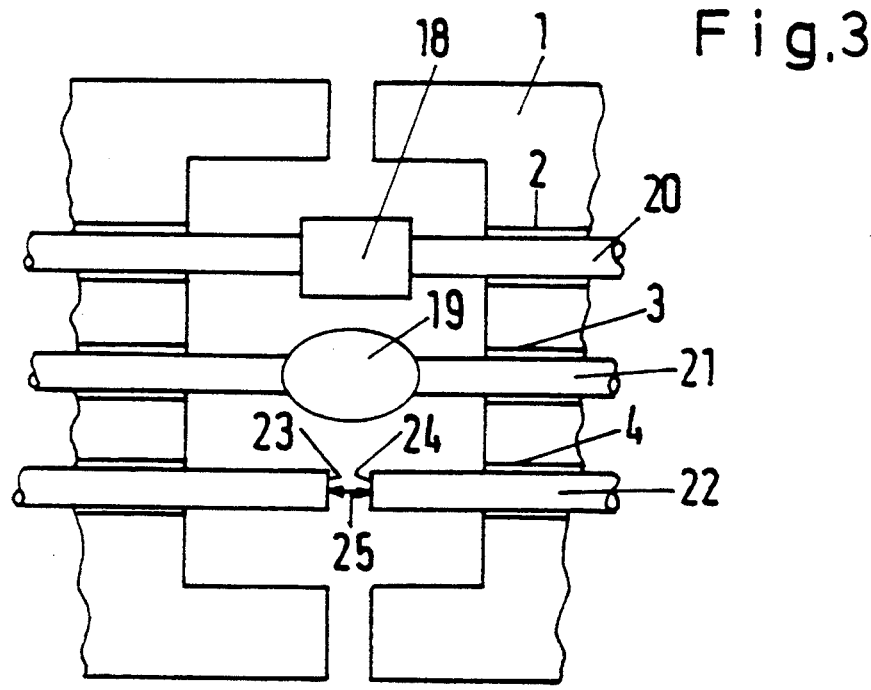
FIG. 3 shows an enlarged view of the coupling plane region seen in FIG. 1 in which one of the light wave guides has been cut and the others have not yet been cut.

FIG. 3 shows three light wave guides 20, 21 and 22, greatly enlarged, and in which the scale is distorted. Of the three wave guides shown, the light wave guides 20 and 21 have not yet been cut, while the light wave guide 22 has already been cut using a laser. The light wave guide 20 still has its coating 18 in the cutting region, while the light wave guide 21 was subsequently provided with a plastic drop at the cutting site. In the light wave guide 22, the coating has partially evaporated in the region of the cutting site, due to cutting by means of a laser, and the end surfaces 23 and 24 of the light wave guide have good quality surfaces due to the laser cutting.

Often, the coating of the light wave guides are removed before the guides are placed into the centering grooves. In this case, the coating 18 can be left in place in the region of the cutting site, because of the window-like recess 8 in the base plate 1. In this case, the subsequent application of a plastic to the light wave guides is no longer required.

The coupling distance 25 between the end faces 23 and 24 of the fibers can be precisely adjusted to within a few $\mu$m by a corresponding selection of the laser parameters. For example, the coupling distance can be selected to be on the order of 10 $\mu$m. This distance is particularly advantageous, since it is large enough to guarantee free movement of the light wave guides during the switching process, without mutual contact, and at the same time is not yet so large that it results in an overly high coupling attenuation.

After the light wave guides 5, 6 and 7 as well as the base plate 1 have been cut, the switch can be activated. If other pairs of light wave guides are to be coupled with one another in a different switching state from the one in which the base plate 1 was attached in the switch 12, then it is necessary to provide a second stop as a counterpart to the stop 26. The second stop should be adjusted in such a way that in a second switching position, different pairs of light wave guides are aligned with one another than are aligned in the first switching position.

What is claimed is:

1. A method for assembling a light wave guide switch having two groups of end faces of light wave guides, each group of end faces facing the other group of end faces and each group being disposed on opposite sides of a coupling plane running perpendicular to a longitudinal axis of each of the light wave guides, said switch further having a base plate with centering devices that extend parallel to each other from a first end of the base plate to a second end of the base plate, each centering device securing a light wave guide that extends through the coupling plane when each of said wave guides forms a single component, said method comprising the steps of:

coupling the first end of the baseplate to a stationary part of the switch while the switch is in a given switching position;

coupling a second end of the base plate to a drivable part of the switch while the switch is in the given switching position;

cutting the light wave guides with a laser in the coupling plane; and cutting the base plate in the region of the coupling plane, wherein the two coupling steps are completed before either of the cutting steps is performed.

2. The method of claim 1 wherein the step of cutting the base plate comprises the step of cutting the base plate with a laser.

3. A method for assembling a light wave guide switch having two groups of end faces of light wave guides, each group of end faces facing the other group of end faces and each group being disposed on opposite sides of a coupling plane running perpendicular to a longitudinal axis of each of the light wave guides, said switch further having a base plate with centering devices that extend parallel to each other from a first end of the base plate to a second end of the base plate, each centering device securing a light wave guide that extends through the coupling plane when each of said wave guides forms a single component, said method comprising the steps of:

coupling the first end of the baseplate to a stationary part of the switch while the switch is in a given switching position;

coupling a second end of the base plate to a drivable part of the switch while the switch is in the given switching position;

cutting the light wave guides with a laser in the coupling plane; and cutting the base plate in the region of the coupling plane, wherein the two coupling steps are completed before either of the cutting steps is performed, the step of cutting the base plate comprises the step of cutting the base plate with a laser, and the step of cutting the base plate is performed before the step of cutting the light wave guides.

4. The method of claim 1 wherein the light wave guides each have a coating and the step of cutting the light wave guides includes the step of cutting the light wave guides and their coatings in the coupling plane with a laser.

5. The method of claim 3 wherein the light wave guides each have a coating and the step of cutting the light wave guides includes the step of cutting the light wave guides and their coatings in the coupling plane with a laser.

6. A method for assembling a light wave guide switch having two groups of end faces of light wave guides, each group of end faces facing the other group of end faces and each group being disposed on opposite sides of a coupling plane running perpendicular to a longitudinal axis of each of the light wave guides, said switch further having a base plate with centering devices that extend parallel to each other from a first end of the base plate to a second end of the base plate, each centering device securing a light wave guide that extends through the coupling plane when each of said wave guides forms a single component, said method comprising the steps of:

coupling the first end of the baseplate to a stationary part of the switch while the switch is in a given switching position;

coupling a second end of the base plate to a drivable part of the switch while the switch is in the given switching position;

cutting the light wave guides with a laser in the coupling plane; and cutting the base plate in the region of the coupling plane, wherein the two coupling steps are completed before either of the cutting steps is performed, and wherein the light wave guides each have a coating and further comprising the steps of removing the coatings in the region of the coupling plane before cutting the wave guides and sheathing the light wave guides with plastic.

7. The method of claim 3 wherein the light wave guides each have a coating and further comprising the steps of removing the coatings in the region of the coupling plane before cutting the wave guides and sheathing the light wave guides with plastic.

8. The method of claim 6 wherein the plastic applied to the light wave guides is applied in liquid form.

9. The method of claim 8 wherein the plastic is formed as an adhesive.

10. The method of claim 9 wherein the adhesive is curable by UV radiation.

11. The method of claim 1 wherein the base plate comprises a window-like, continuous recess disposed in the region of the coupling plane which produces two cross-pieces disposed on opposite sides of the recess that extend parallel to the light wave guide.

12. The method of claim 11 wherein the base plate is formed from silicon.

* * * * *